Jan. 25, 1966   J. KRITZ   3,231,852
COMBINATION RADIO RECEIVER AND UNDERWATER
DOPPLER ACOUSTICAL DEVICE
Filed Nov. 2, 1962   2 Sheets-Sheet 1
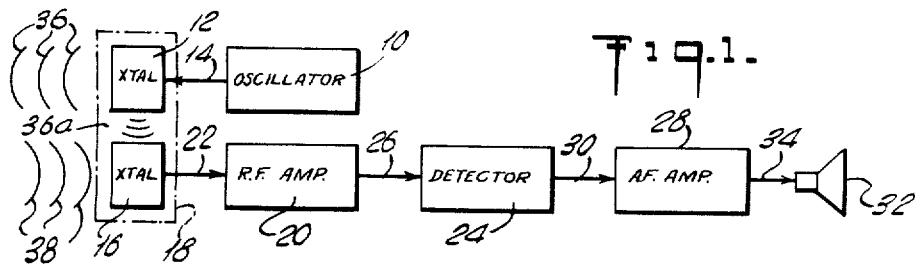
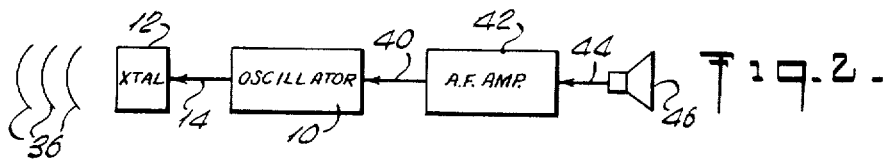
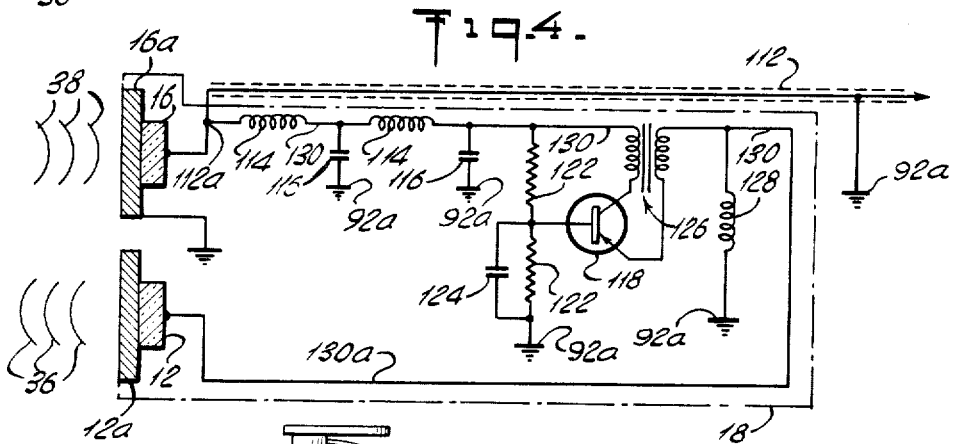
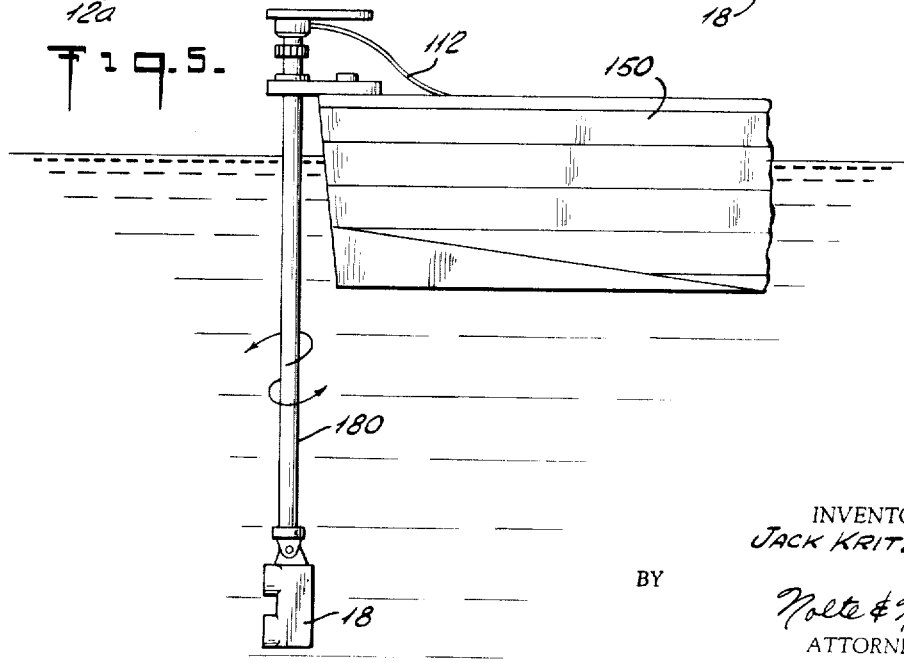
INVENTOR.
JACK KRITZ
BY
Nolte & Nolte
ATTORNEYS

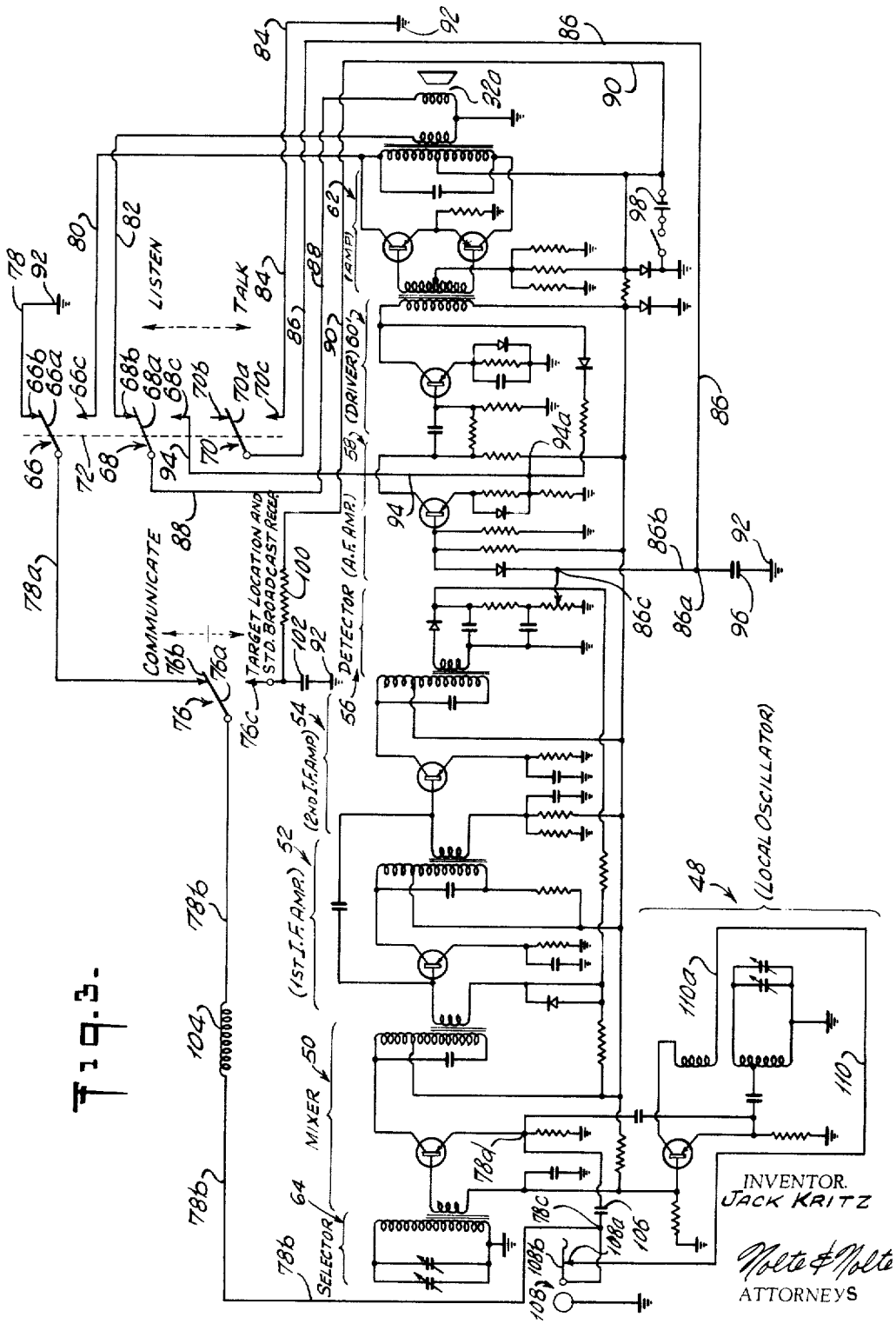

United States Patent Office 3,231,852
Patented Jan. 25, 1966

3,231,852
COMBINATION RADIO RECEIVER AND UNDER-
WATER DOPPLER ACOUSTICAL DEVICE
Jack Kritz, Westbury, N.Y., assignor to Janus Products,
Inc., Westbury, N.Y., a corporation of Delaware
Filed Nov. 2, 1962, Ser. No. 235,038
6 Claims. (Cl. 340—3)

This invention pertains, in general, to a combined surveillance and communication system. More particularly, the system and apparatus provided by the invention enables: the detection and location of moving and immobile objects under, or in, water (e.g. fish, approaching vessels, etc.); the communication of intelligence by using water as a propagation medium for the transmission and reception of intelligence-bearing ultrasonic energy; and, the reception of radio frequency broadcast transmissions.

One object of the invention is to provide a system and apparatus for finding fish.

Another object of the invention is to detect the approach of other vessels during conditions of poor visibility, such as fog, in order that a collision can be avoided.

Another object of the invention is to provide a system and apparatus for the transmission and reception of sea water-propagated intelligence-modulated ultrasonic energy.

Another object of the invention is the provision of a system and apparatus for enabling all of the aforementioned functions and, in addition, for enabling the reception of electromagnetically-radiated radio frequency transmissions.

Another object of the invention is to provide a system and apparatus for accomplishing the aforementioned objects in a relatively simple, reliable and inexpensive way.

Briefly, in accordance with an illustrative embodiment of the invention, an electrically excited first piezoelectric transducer having a directional, or narrow beam, radiation pattern is situated in a lake, inlet, or the like. The first transducer, being electrically excited, transmits a relatively narrow beam of ultrasonic wave energy through the water. Means for turning the first transducer are provided so that its radiated narrow beam can "sweep," or scan, the underwater field. Accordingly, the narrow beam of radiated ultrasonic waves "illuminates" a target (e.g. fish, an approaching vessel, etc.) in the field. As the target receives the transmitted waves it reflects them to a second piezoelectric transducer. The second transducer has directional, or narrow beam, characteristics similar to the first transducer and is, in addition, housed in common with the first transducer so that the second, or receiving, transducer is permanently oriented with respect to the first, or transmitting, transducer and is turned in fixed relationship together with the first transducer.

The first transducer is electrically excited. Its function is to convert an alternating, or varying, electrical driving signal into vibrational, or ultrasonic, energy; the vibration, or ultrasonic, energy being propagated as a longitudinal wave through the water toward the target. The second, or receiving, transducer in response to the vibrational, or ultrasonic, energies reflected from the target converts the reflected ultrasonic energies into an electrical signal. In the absence of relative motion between the target and the transducers the frequencies of the transmitted and reflected waves are the same. If, however, there is relative motion between the target and the transducers the transmitted and received frequencies will be different in accordance with the well-known Doppler effect. This difference frequency (Doppler frequency) between the transmitted and reflected frequencies is detected. Accordingly, the target may be tracked by turning the transducers so as to acoustically illuminate the moving target.

Alternatively, voice communication using sea water as a propagation medium is made possible by voice modulating the electrical signal driving the transmitting transducer. Also, voice reception is enabled by coupling the electrical output of the receiving transducer into a standard broadcast receiver such as, for example, a super heterodyne receiver.

Advantageously, a standard radio broadcast receiver, modified as hereinafter described, may be used: (1) for the transmission and reception of unmodulated ultrasonic energy for the purpose of target location; (2) the transmission of voice-modulated ultrasonic energy; (3) the reception of voice-modulated ultrasonic energy and the subsequent detection of the intelligence; and, (4) the reception of electromagnetically radiated standard broadcast transmissions.

Other objects achieved, the many features and advantages, and a fuller appreciation of the invention are to be had by referring to the following description thereof; and, to the accompanying drawings, in which:

FIG. 1 is an illustration in block diagram form of the transmission and reception circuitry of the invention; the circuitry illustrated being intended for the location of targets such as fish, approaching vessels, etc.

FIG. 2 is an illustration in block diagram form showing the transmission circuitry modified by the inclusion of intelligence-modulation means.

FIG. 3 is a schematic diagram of a portable transistorized superheterodyne radio receiver as modified according to the invention to enable target location, communication, and reception of standard broadcast frequency transmissions.

FIG. 4 is an electrical schematic diagram showing, among other things, a transistor oscillator for electrically exciting the transmitting transducer.

FIG. 5 is an illustration of the housing and turning assembly used for supporting the transducers.

In the block diagram of FIG. 1 the output of an oscillator 10 is electrically coupled to a transmitting transducer 12 via the electrical path 14. The transmitting transducer 12 is situated, together with a receiving transducer 16, within a housing 18. The receiving transducer 16 is electrically connected via the electrical path 22 with a radio frequency amplifier 20. The output signals from the amplifier 20 are passed via the electrical path 26 to a detector 24. An audio frequency amplifier 28 amplifies the detected signals and translates them to the speaker 32. The output of the detector 24 is coupled to the input of the audio frequency amplifier 28 via the electrical path 30 and the speaker 32 is coupled with the output of the audio amplifier 28 via the electrical path 34.

Assume that the housing 18, containing the transmitting and receiving transducers, 12 and 16, is submerged in water for the purpose of locating a target such as a fish, an approaching vessel, etc. When energized, the oscillator 10 drives the transmitting transducer 12, electrically. For example, the oscillator 10 generates an A.C. signal, sinusoidal in form, at a fixed frequency; 455 kilocycles being suitable for the purpose and especially advantageous for communication purposes as is hereinafter explained more fully.

The transmitting transducer 12 and the receiving transducer 16 are both thickness mode piezoelectric vibrators which may be formed from quartz, barium titanate, or the like.

The transmitting transducer 12, in response to the received electrical signals from the oscillator 10, vibrates in its thickness mode and, accordingly, sends out through the water a longitudinal wave train symbolically indicated and identified by the reference numbers 36 at FIG. 1. The target, being ultrasonically illuminated by the transmitted wave train 36, reflects a wave train, designated by the reference number 38 back to the receiving transducer 16. In addition to wave train 38 which is reflected from the target a portion of the transmitted wave train 36 is transmitted by the transmitting transducer 12 to the receiving transducer 16. For purposes of clarity this portion of the transmission from transducer 12 in indicated at FIGURE 1 by the reference number 36a; the wave train 36a being propagated between the transducers through the housing structure 18 and the common water path between the transducers. Thus, the receiving transducer 16 is vibrationally excited by the reflected wave train 38 and the cross-coupled wave train 36a. Accordingly, the receiving transducer 16 excited by these wave trains feeds an electrical signal to the input of the radio frequency amplifier 20.

Before proceeding with further discussion as to the processing of the signal fed into amplifier 20 a brief discussion of the fundamental principle upon which target location is accomplished will be helpful. The principle employed utilizes the Doppler effect. When there is relative motion between the transducers and the target the reflected wave train 38 sensed by the receiving transducer 16 has a frequency which is different from the frequency of the transmitted wave train 36; the frequencies of the wave trains 36 and 36a being equal. The difference between the transmitted frequency and the reflected frequency, which is received by the transducer 16, is called the Doppler frequency. Mathematically, the Doppler frequency, or difference frequency, can be determined from the following expression:

$$\Delta f = 2v/cf_0$$

In this expression, $\Delta f$ is the Doppler, or difference, frequency in cycles per second; $f_0$ is the transmitted frequency, in cycles per second; $v$ is the component of the velocity vector between the transducers assembly and the target, in feet per second; and, $c$ is the propagation velocity vector between the transducer's assembly and the target, in feet per second; and, $c$ is the propagation velocity of ultrasonic energy in sea water, which is about 5,000 feet per second. Thus, at a transmission frequency of one megacycle, a target (e.g., a fish) moving with a velocity of one foot per second relative to the transducer's housing, a Doppler frequency of 400 cycles per second will occur. At a transmission frequency of 455 kc., a target moving at one foot per second relative to the transducer's housing will create a Doppler frequency of 182 cycles per second. Of course, if there is no relative motion between the target and the transducer's housing, the transmitted and reflected wave trains 36 and 38 will have equal frequencies. Hence, the Doppler frequency will be zero.

Returning to FIG. 1, the input signal to the radio frequency amplifier 20 from the receiving transducer 16 is an electrical signal comprised of frequencies including the transmission frequency and the frequency of the reflected wave train. After amplification in the radio frequency amplifier 20, the signal is translated to the input of the detector 24. The detector 24 detects and translates the Doppler, or difference, frequency to the input of the audio amplifier 28. From the sample calculations, hereinbefore appearing, it will be appreciated that the Doppler frequency is very much smaller than the transmitted frequency, and the frequency of the reflected wave train 38. The loudspeaker 32 being coupled with the output of the audio frequency amplifier renders the Doppler frequency audible. Although a loudspeaker 32 is indicated as the monitoring device at FIG. 1, it is to be understood that a frequency meter (not illustrated) may be used together with, or instead of, the speaker 32; the frequency meter providing a visible and very accurate readout of Doppler frequency.

The transducers 12 and 16, being thickness mode piezoelectric vibrators, are arranged and mounted within the housing 18 in a manner well known to those skilled in the art so that they have a directional, or narrow beam, characteristic.

Shown at FIG. 2 is a modification of the transmission circuitry of FIG. 1. As shown at FIG. 2, voice-modulated electrical signals can be used to drive the transmitting transducer 12. A loudspeaker 46, which in this case functions as an electrodynamic microphone converts voice energy into electrical signals. These audio-range electrical signals are fed into an audio amplifier 42 via the electrical path 44. The amplified audio-spectrum signal is fed into the fixed frequency oscillator 10 via the electrical path 40; the fixed frequency of the oscillator 10 being the carrier which is modulated with voice intelligence. Thus, the signal driving the transmitting transducer 12 is an amplitude modulated signal. Modulated ultrasonic energy propagated through water, as a propagation medium, can be received and converted into audible signals with the reception circuitry shown at FIG. 1; i.e., the transducer 16, the R.F. amplifier 20, a suitable detector 24, an audio frequency amplifier 28 and the loudspeaker 32.

Advantageously, the component circuits 20, 24, 28 and 32, shown at FIG. 1, comprise the circuitry of a commercially available radio broadcast receiver. The exception, of course, is that, as shown at FIG. 1, a piezoelectric transducer 16 is employed instead of an antenna. To further advantage, the frequencies available for use in the A.M. standard broadcast band (i.e., about 540 kc. to 1600 kc.) permit the use of narrow beam width transducers of moderate dimensions.

As is more fully described hereinafter with reference to FIGS. 3 and 4, it is particularly advantageous to employ a superheterodyne broadcast receiver. Such receivers are abundantly available and are relatively inexpensive. As is well known, the superheterodyne broadcast receiver employs, among other things, an intermediate frequency (I.F.) amplifier which is sharply tuned to provide an output signal of fixed frequency. In addition, a local oscillator is employed for the purpose of heterodyning received signals to the fixed frequency of the I.F. amplifier. In most superheterodyne standard broadcast band receivers the I.F. amplifiers are sharply tuned to provide an amplified output at 455 kc.

FIG. 3 is a schematic of a conventional A.M. standard broadcast superheterodyne receiver as modified in accordance with the present invention to enable the accomplishment of the objects hereinbefore set forth. Since the receiver per se and the functioning of its various circuits are well known an extended discussion of the basic receiver is not necessary. For purposes of clarity the modifications (i.e. conductors and components) are shown at FIG. 3 in heavily darkened lines.

Those persons familiar with transistorized superheterodyne radio receivers will recognize at FIG. 3 the concatenated circuits comprising the conventional superheterodyne radio receiver which is capable of receiving and making audible amplitude-modulated electromagnetically-radiated broadcast transmissions. In brief, the selector 64 (a loop antenna including tuned circuit means) is simultaneously tuned with the local oscillator 48 so as to provide an input to the mixer stage 50; the input being an electrical signal including the carrier frequency of the broadcast transmission and a heterodyning signal provided by the local oscillator. As is well known the mixer 50 heterodynes, or beats, these two signals thereby providing a fixed frequency input signal to the first intermediate frequency (I.F.) amplifier 52. Conventionally, the amplitude-modulated (A.M.) standard broadcast band carrier frequency transmitted ranges from about 540 kc. to 1600 kc. The mixer 50 coacting with the gang-tuned local oscillator 48 and the selector 64 heterodynes the transmitted carrier frequency and local oscillator frequency to provide an output of 455 kc.; 455 kc. being the output signal frequency of the mixer 50 for every one of the transmitted broadcast band frequencies because of the simultaneous tuning of the local oscillator 48 and the selector 64. The first I.F. amplifier 52 amplifies and translates the amplitude-modulated 455 kc. signal to a second I.F. amplifier stage 54; both I.F. amplifiers, 52 and 54, being sharply tuned to 455 kc. The amplified 455 kc. signal from the second I.F. amplifier 54 is fed into a detector stage 56. As is well known the detector stage 56 by virtue of its rectifying action translates only the audio range modulating signal to the audio frequency (A.F.) amplifying stage 58; the I.F. frequency, 455 kc., being, in effect, suppressed. (Those persons familiar with the radio receiver art will recognize that the detector stage 56 includes the automatic gain control means represented by the resistance-capacitance network.) The audio frequency amplifier 58 amplifies the audio range signals received from the detector 56 and translates these amplified audio range signals to a driver stage 60. The driver stage 60, in turn, drives the transistorized push-pull amplifier 62. The loudspeaker 32a, being transformer-coupled with the output of the amplifier 62, converts the amplified audio range electrical signals to audible sound.

During the brief discussion just completed of the functioning of the conventional superheterodyne radio receiver illustrated at FIG. 3 the various circuits have been identified and described in but general terms. While the many components have not been identified by reference numerals they are illustrated in the conventional and well known symbols employed in the communication arts.

As stated hereinbefore, the modifications to the standard broadcast receiver are illustrated in the heavily darkened lines of FIG. 3: Three single-pole double-throw switches 66, 68 and 70 are ganged by virtue of the mechanical linkage 72 for operation in unison; the pushbutton or plunger 74 being connected to one end of the mechanical linkage 72 so that manual initiation of the simultaneous operation of all three switches is enabled. As illustrated, the single-pole double-throw switch 66 is comprised of the switch blade 66a and the two fixed contacts 66b and 66c. Similarly, the single-pole double-throw switch 68 is comprised of the switch blade 68a and the two fixed contacts 68b and 68c. Likewise, the single-pole double-throw switch 70 is comprised of the switch blade 70a and the two fixed contacts 70b and 70c. As shown, another single-pole double-throw switch 76 is provided; the single-pole double-throw switch 76 being comprised of the switch blade 76a and the two fixed contacts 76b and 76c. As shown at FIG. 3, a conductor 78 is connected between the fixed contact 66b and the receiver chassis, designated generally by the reference number 92. A conductor 80 is connected between the fixed contact 66c and one side of the primary winding of the output transformer in the audio amplifier stage 62. Another conductor 82 is connected between the fixed contact 68b and one side of the secondary winding of the output transformer in the audio amplifier stage 62. The conductor 84 is connected between the fixed contact 70c and the chassis 92. Another conductor 86 is connected between the switch blade 70a and the terminal 86a. Between the terminal 86a and the chassis 92 there is serially connected a capacitor 96; the conductor 86b being coupled between terminal 86a and another terminal 86c, which is between the detector stage 56 and the audio frequency amplifier 58 as shown at FIG. 3. Another conductor 88 is connected between the switch blade 68a and one side of the coil of the speaker 32a. Another conductor 90 is coupled between the fixed contact 76c and the negative terminal of the battery 98; the resistor 100 being serially coupled with the conductor 90 as shown. Between the fixed terminal 76c and the chassis 92 there is coupled a capacitor 102. The conductor 94 is connected between the fixed contact 68c and the terminal 94a which is in the audio frequency amplifier stage 58 as shown at FIG. 3. Between the switch blade 66a and the fixed contact 76b there is connected the conductor 78a. The conductor 78b, containing in series therewith the R.F. choke coil 104, is connected between the switchblade 76a and the terminal 78c; the capacitor 106 being coupled between the terminal 78c and the terminal 78d (the terminal 78d being common to the emitter of the transistor in the mixer stage 50). A jack designated generally by the reference number 108 is provided; the jack 108 having a fixed contact 108a and a movable contact 108b. Normally, the contact 108b is closed; i.e. in contact with the fixed contact 108a as shown at FIG. 3. (The switch action of the jack 108 is discussed in greater detail hereinafter.) The conductor 110 is connected between the jack's fixed contact 108a and the terminal 110a; the terminal 110a being at the termination of a regenerative winding which is coupled with the collector electrode of the transistor in the local oscillator stage 48.

Shown at FIG. 4, in schematic form, is a transistorized oscillator which is capable of exciting the transmitting transducer 12 at 455 kc. Advantageously, the oscillator circuit shown is packaged together with the transmitting and receiving transducers 12 and 16 within the housing 18 (shown in dotted line fashion at FIG. 4). The transmitting and receiving transducers 12 and 16 are each bonded to a face of the thin aluminum plates 12a and 16a, respectively. A feature of the oscillator circuit shown is that a single coaxial conductor 112 is all that is required to make interconnection with the modified radio receiver, shown at FIG. 3, at the jack 108; i.e. the coaxial conductor 112 coupling the circuit of FIG. 4 with the circuit of FIG. 3. As shown, the aluminum plate 16a of the receiving transducer 16 is grounded as shown at 92a, as is the center conductor of the coaxial conductor 112.

Commonly coupled at terminal 112a with the coaxial conductor 112 is the conductor means 130. Serially coupled with the conductor means 130 are the two inductances 114 and the primary winding of the transformer 126. Connected between the conductor 130 and the ground connection 92a are the two capacitors 116; the inductances 114 and the capacitors 116 forming a low-pass filter section. As shown, one side of the winding of the transformer 126 is coupled to the collector electrode of the transistor 118; and, the emitter electrode of the transistor is coupled to the other side of the transformer 126. The capacitor 124 and the resistor 122 provide the biasing potential at the base electrode of the transistor. Serially coupled with one of the transformer's winding and the transmitting transducer 12 is another conductor means 130a; the inductance 128 being connected in parallel with the conductor 130a and the ground 92a as shown. Electrical energy from the receiving transducer 16 is directly coupled to the coaxial conductor means 112. Simultaneously, the coaxial conductor 112 is connected to the battery 98 of the receiver through the low pass filter section represented by the inductances 114 and the capacitances 116. In this way battery voltage from the superheterodyne receiver is permitted on the same coaxial connection which delivers the signal to the receiver. As shown at FIG. 3 the coaxial conductor means is connected through the jack 108 and a coupling capacitor 106 to the input of the superheterodyne receiver; i.e. to the emitter electrode of the transistor in the mixer stage 50. Also, the electrical input from the coaxial conductor means 112 is fed via the conductor 78b through the high inductance radio frequency choke 104. As may be appreciated from FIG. 3 the single-pole double-throw switch 76 may be in the sea-water communication position, as shown; or, in the alternative, in contact with the terminal 76c to enable target location or standard broadcast reception. When in the communicate position, the ganged single-pole double-throw switches 66, 68 and 70 may be put in the listen position or the talk position, as labeled at FIG. 3. In the talk position the speaker 32a is voice driven as an electrodynamic microphone to modulate the transmitting transducer 12 thereby enabling propagation of voice-modulated ultrasonic energy through the water medium. When in the listen position the receiving transducer 16 couples electrical signals into the speaker 32a thus rendering water-propagated voice communication audible.

The jack 108 has normally closed contacts 108a and 108b. When the oscillator's coaxial conductor 112 is not plugged in, the receiver functions normally by virtue of the local oscillator 48 connection through the normally closed contacts of the jack 108. When the coaxial conductor 112 is plugged into the jack 108 the local oscillator 48 is disconnected from the receiver circuit thus rendering the receiver unresponsive to frequencies in the broadcast band, yet still operative at 455 kc. The 455 kc. signal from the receiving transducer 16 and the oscillator of FIG. 4 is applied to the emitter of the input transistor in the mixer stage 50 and effectively couples the signal to the input of the first I.F. amplifier through the collector of the mixer stage. The other function of the push-to-talk switch assembly 66, 68 and 70 is to transfer the speaker 32a from its coupling at the output of the amplifier 62 to serve as a microphone when in the talk mode is selected.

FIG. 5 is an illustration showing one way in which the apparatus of the present invention may be used on board a small boat 150. A housing 18 containing the transducers 12 and 16, bonded to the aluminum plates 12a and 16a, and the oscillator (FIG. 4) is immersed in water from the bow of the boat. A long wand 180, or pole, supports the housing 18; the wand 180 being a conduit for the coaxial conductor 112. As suggested by the arrows in FIG. 5, the wand 180 and the housing 18 can be rotated for the purpose of scanning the underwater field.

It is to be understood that the above-described arrangements are illustrative of the application of the principles of the invention. Many other arrangements may be devised by those skilled in the art without departing from the spirit and scope of the invention hereinafter defined in the appended claims.

What is claimed is:

1. The combination of a superheterodyne radio receiver and underwater Doppler acoustical device for detecting velocity of a target relative to the location of said device; said receiver including an antenna, a selector having a variable tuned circuit connected from said antenna, a local oscillator, a mixer, the output of said local oscillator and selector being connected to said mixer, a tuned intermediate frequency amplifier connected from the output of said mixer, detector means connected from the output of said intermediate frequency amplifier for demodulating amplitude modulated signals arriving at said antenna, audio amplifier means connected to the output of said detector, and first transducer means connected to the output of said audio amplifier for converting the output thereof to sound energy; said Doppler acoustical device including a transmitter oscillator, and second transducer means for radiating acoustical energy into the water in response to energization of said oscillator, and for receiving acoustical energy, said second transducer means including an output channel for providing a signal in response to acoustical energy transmitted through the water; connector means for coupling the output channel of said second transducer to the input of said receiver and for disconnecting said local oscillator; said combination also including first switch means having a first position for enabling voice communication between said first transducer and the water, and a second position for energizing said transmitter oscillator whereby reflections of said transmitted acoustical energy received by said second transducer means are mixed with the output frequency of said transmitter oscillator to produce Doppler signals, and means for coupling said Doppler signals to said first transducer means to indicate relative velocity between said second transducer means and a target.

2. The combination according to claim 1, whereby said first switch in said first position enables combination of the signals from said first transducer means and said transmitter oscillator for voice modulation of the acoustical energy transmitted by said second transducer means.

3. A combination according to claim 2, including second switch means operable when said first switch means is in said first position for selectively connecting said first transducer means as the input to said second transducer means to transmit voice modulated acoustical energy through the water or to connect the output of said second transducer means to said radio receiver to receive voice modulated energy transmitted through the water.

4. A combination according to claim 3 wherein said connector means is operative to connect the output of said second transducer means to the input of said tuned intermediate frequency amplifier.

5. A combination according to claim 4, wherein said transmitter oscillator frequency is the same as the frequency to which said intermediate frequency amplifier is tuned.

6. A combination according to claim 4, wherein said transmitter oscillator frequency is aproximately 455 kilocycles.

References Cited by the Examiner

UNITED STATES PATENTS

| 2,159,632 | 5/1939 | Morey | 179—2 |
| 2,671,206 | 3/1954 | Krause | 340—5 |
| 2,770,795 | 11/1956 | Peterson | 340—3 |
| 2,798,902 | 7/1957 | Kursman | 340—5 |

OTHER REFERENCES

N. D. Miller, "An Underwater Communication System," IRE Transactions on Communications Systems, vol. CS-7, No. 4, December 1959, pp. 249–251 relied on.

CHESTER L. JUSTUS, *Primary Examiner.*